United States Patent
Quan

(10) Patent No.: US 6,349,139 B1
(45) Date of Patent: Feb. 19, 2002

(54) METHOD AND APPARATUS FOR MINIMIZING CHROMA SUBCARRIER INSTABILITY CAUSED BY A VIDEO LINE SCRAMBLING SYSTEM

(75) Inventor: Ronald Quan, Cupertino, CA (US)

(73) Assignee: Macrovision Corporation, Sunnyvale, CA (US)

( * ) Notice: Subject to any disclaimer, the term of this patent is extended or adjusted under 35 U.S.C. 154(b) by 0 days.

(21) Appl. No.: 09/180,452
(22) PCT Filed: Jun. 17, 1997
(86) PCT No.: PCT/US97/10487
  § 371 Date: Nov. 6, 1998
  § 102(e) Date: Nov. 6, 1998
(87) PCT Pub. No.: WO97/49247
  PCT Pub. Date: Dec. 24, 1997
(51) Int. Cl.$^7$ ................................................. H04K 1/00
(52) U.S. Cl. ........................ 380/200; 380/210; 380/213
(58) Field of Search ............................... 380/200, 210, 380/213

(56) References Cited

U.S. PATENT DOCUMENTS

| | | | | |
|---|---|---|---|---|
| 4,316,210 A | * | 2/1982 | Wharton | 386/9 |
| 5,438,620 A | * | 8/1995 | Ryan et al. | 380/218 |
| RE35,078 E | * | 10/1995 | Ryan | 380/218 |
| 5,504,815 A | * | 4/1996 | Ryan et al. | 380/213 |
| 5,519,454 A | * | 5/1996 | Willis | 348/663 |

* cited by examiner

Primary Examiner—Thomas R. Peeso
(74) Attorney, Agent, or Firm—Frank Nguyen; George Alameida

(57) ABSTRACT

In certain video scrambling systems, composite video is imperfectly separated into luminance and chrominance and scrambled in such a way that an unstable residual chroma color subcarrier remains in the luminance channel. When this unstable residual subcarrier subsequently is summed with stabilized chroma, the resultant composite color signal has small but visible amounts of color subcarrier instability that causes a noisy color signal when descrambled or when displayed on a television display device. A coring circuit is disclosed which provides means for substantially removing the unstable residual chroma subcarrier from the luminance channel, thereby substantially reducing color subcarrier instabilities. An improved coring technique also is disclosed using adaptive chroma coring, which is achieved by adjusting the amount of coring applied in accordance with the amplitude of the chrominance signal. Thus, if the program video input has high levels of color saturation, the chroma coring is electronically turned up. Conversely, if the input video program is essentially in black and white (no color content), then the coring circuit essentially is electronically turned off. The coring techniques also are applicable to enhance the luminance-chrominance separation of video comb filters frequently used in video circuits such as, for example, television sets and video recorders.

23 Claims, 8 Drawing Sheets

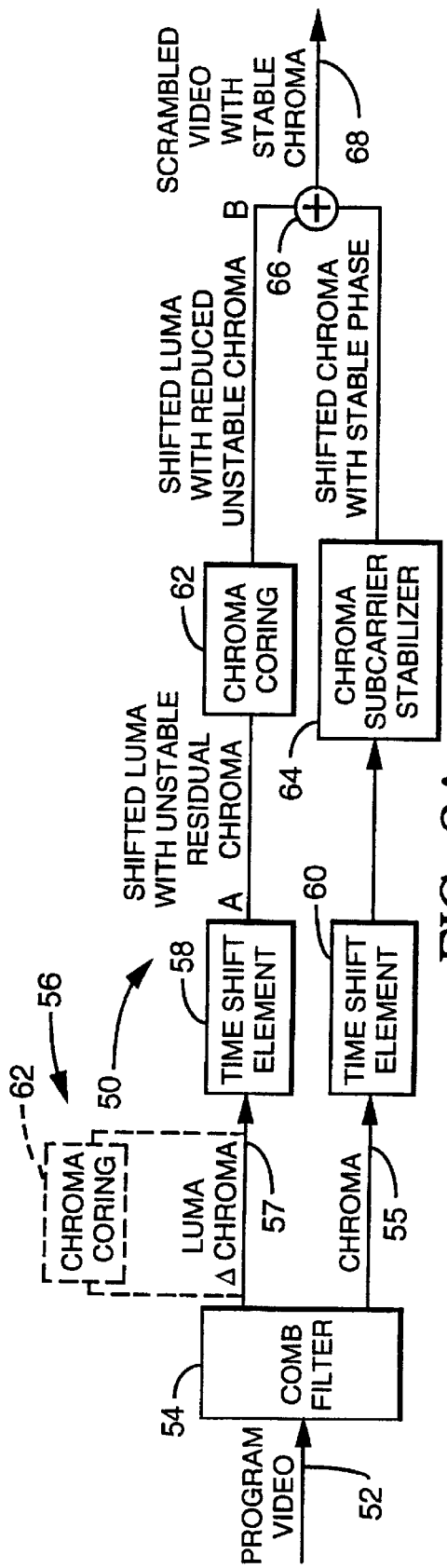
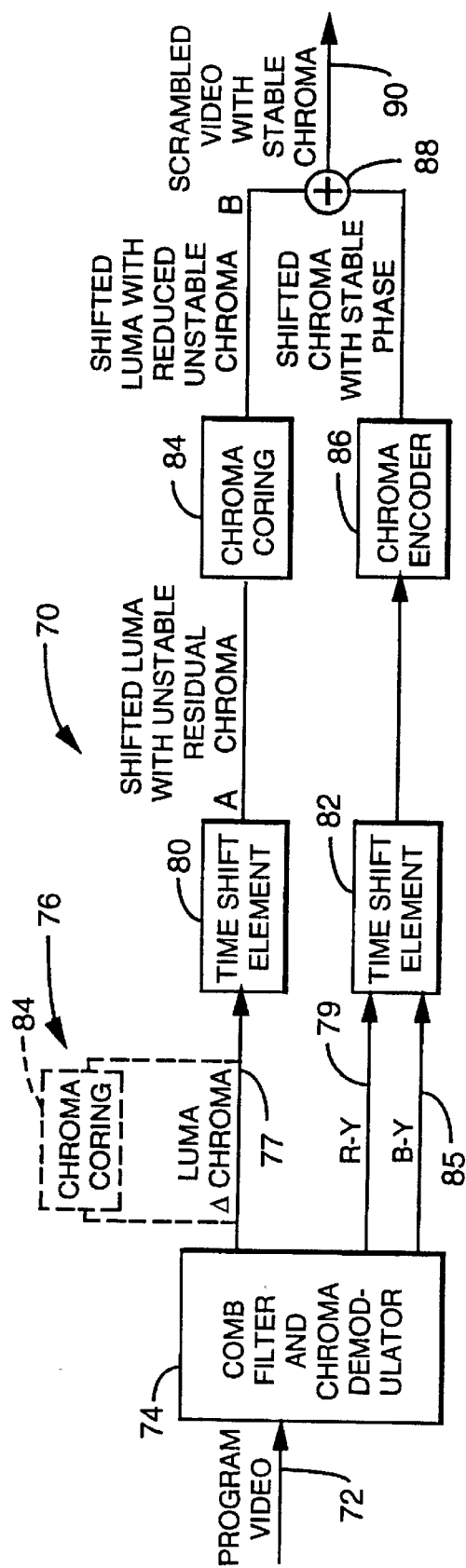
FIG. 2A
FIG. 2B

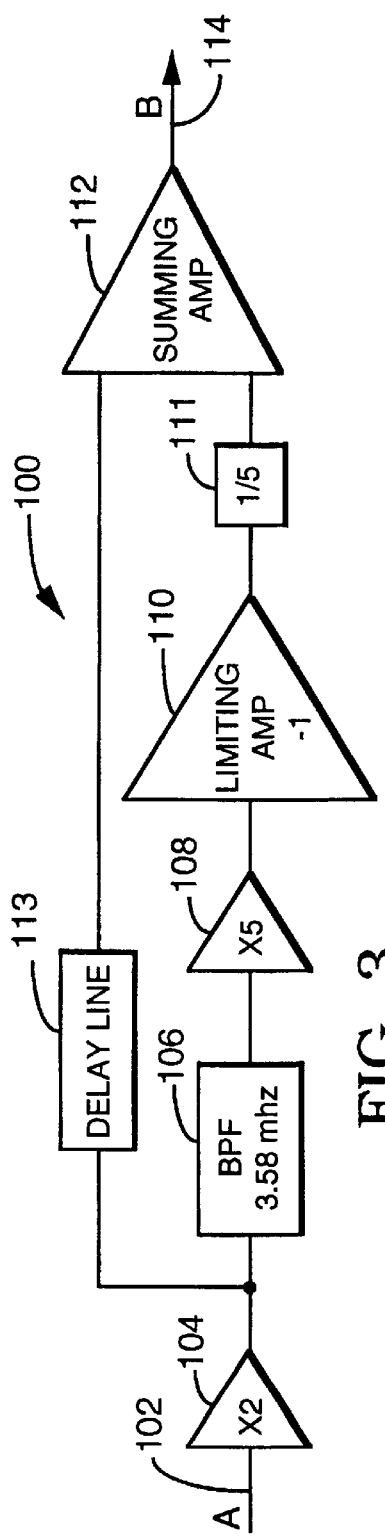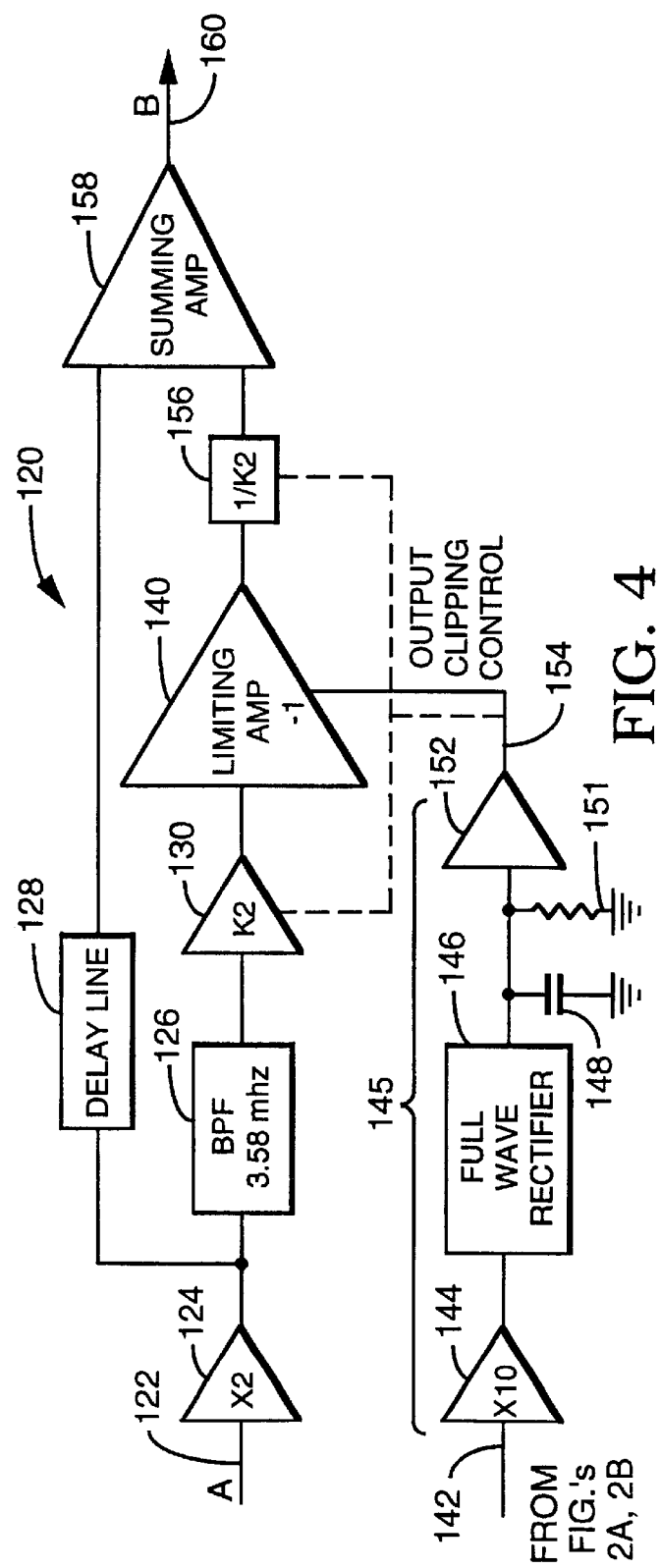

US 6,349,139 B1

METHOD AND APPARATUS FOR MINIMIZING CHROMA SUBCARRIER INSTABILITY CAUSED BY A VIDEO LINE SCRAMBLING SYSTEM

RELATED PATENTS

This application is a nonprovisional application based on the copending provisional application No. 60/011,584, filed Jun. 17, 1996. This application is related to U.S. Pat. No. Re. 35,078 by J. O. Ryan issued on Oct. 31, 1995, U.S. Pat. No. 5,438,620 by J. O. Ryan et al. issued on Aug. 1, 1995 and U.S. Pat. No. 5,504,815 by J. O. Ryan et al. issued on Apr. 2, 1996.

BACKGROUND OF THE INVENTION

The present invention relates to video signal scrambling systems and, more particularly, to a coring system for providing a substantially stable color subcarrier signal while retaining full luminance resolution, in line time shifting or position modulating video scrambling apparatus.

The U.S. Pat. Nos. Re. 35,078 ('078), 5,438,620 ('620) and 5,504,815 ('815) of previous mention, incorporated herein by reference, disclose typical line positional shifting video scrambler processes and apparatus. Such line positional or time shifting video scramblers include a video comb filter or equivalent luminance/chrominance separator to separate the composite input signal into luminance and chrominance components (see FIG. 1A) or luminance and demodulated chrominance R-Y and B-Y components (see FIG. 1B). The separated signals then are shifted in time or position via suitable memories, such as first-in-first-out (FIFO) memories, or variable delay lines. In FIG. 1A, the chrominance signal first is time shifted (that is, scrambled) and then is color subcarrier stabilized in both phase and frequency (for example, via a heterodyning process), before being added to the scrambled luminance signal, to provide a composite color stabilized time or position modulated scrambled video output signal. In FIG. 1B, where the R-Y and B-Y demodulated chrominance components are provided, the time shifted or position modulated R-Y and B-Y components are re-encoded with a stable color subcarrier frequency and phase before being added to the time shifted or position modulated luminance signal to provide a composite color stabilized time shifted or position modulated scrambled video output signal.

However, the video comb filter or luminance/chrominance separator of the above scrambling systems does not provide perfect separation of the chrominance (chroma) and luminance (luma) components. Therefore residual chroma remains in the luma channel in the scrambling systems described above. Normally, imperfect luminance-chrominance separation is not a problem in equipment such as television sets. That is, in such equipment, the residual chrominance in the luminance channel still is stable chrominance and thus does not contribute to chrominance instabilities in, for example, the television set. However, once the luma channel is time shifted by the scrambling process, the residual chroma becomes unstable in phase and frequency. When the time shifted or (low frequency) position modulated luminance channel signal with the unstable residual chroma is added to the stabilized time shifted chroma channel signal, a composite video signal is produced with small, but visible, unstable chroma phase and amplitude errors when scrambled and later descrambled. These unstable chroma phase and amplitude errors cause low frequency color streaking or hue and saturation noise throughout the television field.

FIG. 1A illustrates a basic video path for a scrambling system 10 which employs a signal wobbling technique, such as described in the '620 and '815 patents of previous mention. A program video signal, such as a composite video signal, is supplied via an input lead 12 to a comb filter 14. The elements 76, 78 and 80 shown in FIG. 4 of the '620 and '815 patents exemplify elements which can be used to form the comb filter 14 in FIG. 1A. The comb filter 14 provides outputs of a luma signal with residual chroma, and a chroma signal. The luma signal along with its residual chroma are supplied to a time shift element 16 to effect the scrambling process, whereby the element 16, provides a shifted luma signal with shifted unstable phase residual chroma. The chroma signal is supplied to a second time shift element 18 which provides the previously mentioned scrambling of the chroma signal. It is to be understood that the time shift elements 16, 18 could be position modulation elements as well. Both of the time shift (or position modulation) elements shift the video signal by an equal amount as part of the particular scrambling process used. The output of the time shift element 18, comprising the time shifted chroma signal, is supplied to a chroma subcarrier stabilizer 20. The chroma subcarrier stabilizer 20 is comparable to the hetrodyne element 100 in FIG. 4 of the '620 and '815 patents, and provides a shifted chroma signal with stable phase. The outputs of the chroma subcarrier stabilizer 20 and of the time shift element 16 are supplied to the inputs of an adder circuit 22, which produces a scrambled video signal having chroma subcarrier instabilities on an output lead 24.

FIG. 1B illustrates a basic video path for a scrambling system 30 which employs a signal wobbling technique such as described in the '078 patent of previous mention. A program video signal, such as a composite video signal, is supplied via an input lead 32 to a comb filter/chroma demodulator circuit 34. The element 16 shown in FIG. 4A of the '078 patent exemplifies an element which can be used as the comb filter/chroma demodulator circuit 34 in FIG. 1B. The comb filter/chroma demodulator circuit 34 provides outputs of a luma signal with some residual chroma, a R-Y component and a B-Y component. The luma signal along with its residual chroma are supplied to a time shift or position modulation element 36, which provides a scrambled luma signal formed of a shifted luma signal with shifted unstable phase residual chroma. The R-Y and B-Y signals are supplied to a two channel time shift element 38 which provides scrambled R-Y and B-Y component signals. The time shift elements 36, 38 shift the respective video signal by an equal amount as part of the scrambling process. The outputs of the time shift element 38, comprising the time shifted or position modulation R-Y and B-Y signals, are supplied to a chroma encoder 40. The chroma encoder 40 is comparable to the encoder element 25 in FIG. 4A of the '078 patent of previous mention, and provides a scrambled chroma signal with stable phase. The outputs of the chroma encoder 40 and of the time shift element 36 are supplied to the inputs of an adder circuit 42, which produces a scrambled video signal having chroma subcarrier instabilities on an output lead 44.

One solution for removing the unstable residual chroma from the positionally shifted luma channel includes the application of a notch filter in the luminance channel, wherein the filter has a frequency band around the color subcarrier frequency and its color sidebands. However, this solution severely degrades the luminance resolution and thus degrades the frequency response of the video scrambler's and thus the descrambler's output. The degraded resolution eliminates much of the advantage that video comb filters provide, since comb filters normally aid in gaining full luminance resolution. Accordingly, there is a need for a solution that eliminates the unstable chroma phase and amplitude errors without degrading the luminance frequency response and the resultant resolution of the signal scrambling system.

SUMMARY OF THE INVENTION

An object of the present invention is to retain full luminance resolution of video scrambling systems while providing a substantially stable color subcarrier. The stable subcarrier phase and amplitude appear in the resulting composite video output signal, corresponding to the time shifted or position modulated scrambled video signal. The increased stability substantially reduces or eliminates chroma noise due to imperfect luminance/chrominance signal separation. That is, it is the intent of the present invention to substantially remove the unstable residual chroma color subcarrier caused by the small amount of chroma signal which leaks into the luma channel, so when the signal in the positionally modulated or time shifted (wobbled) luminance channel is summed with the signal in the positionally modulated or time shifted stable chroma color subcarrier channel, color instabilities are substantially reduced to a minimum.

To this end, the method and apparatus of the present invention employs a chroma coring system to remove the unstable residual chroma color subcarrier, that is, the unstable residual chroma, in the luma channel. An alternative embodiment of the invention provides further improvement by including an adaptive chroma coring system. The adaptive chroma coring is provided by variably adjusting the amount of coring applied in accordance with the chroma amplitude sensed in the chrominance signal in the scrambled stabilized chroma color subcarrier channel, or in the signal derived from a video comb filter in the chrominance channel. For example, if the program video input signal has large areas of highly saturated color components, the chroma coring is electronically turned up. At the other extreme, if the program video signal is essentially in black and white (no color content), then the coring circuit essentially is electronically turned off. Thus, the adaptive coring technique maximizes the frequency and pulse response for black and white signals.

It is to be understood that the invention also can be used to enhance the luminance-chrominance separation of video comb filters frequently used in other video circuits and systems such as television sets and video recorders.

These and other aspects, features and advantages of the invention will become apparent upon review of the succeeding description taken in connection with the accompanying drawings.

BRIEF DESCRIPTION OF THE DRAWINGS

FIG. 2A is a block diagram illustrating the invention incorporated into a device such as depicted in FIG. 1A;

FIG. 2B is a block diagram illustrating the invention incorporated into a device such as depicted in FIG. 1B;

FIG. 3 is a block diagram illustrating an embodiment of a chroma coring circuit of the invention;

FIG. 4 is a block diagram illustrating another embodiment comprising an adaptive version of the invention of FIG. 3;

DESCRIPTION OF THE PREFERRED EMBODIMENTS

Signal coring is a process whereby low level signals below a selected amplitude are denied passage through a specific circuit, and signals greater than the selected amplitude are allowed passage through the circuit. In the present invention, coring is used to enhance the luminance and chrominance separation of the comb filter. A complementary class B or C transistor amplifier with crossover distortion is an example of a coring circuit as depicted in FIG. 1C. To this end, any signal between about +0.7 volt to −0.7 volt are denied passage whereas all other signals greater than about 0.7 volt in absolute value are allowed passage. See for example FIGS. 1C, 1D. The coring circuit can be placed before or after the time shifting element (i.e., the memory, FIFO, delay line, etc.) of the video scrambler's luminance channel to meet the intent of this invention.

As depicted in FIGS. 2A, 2B, in the preferred embodiment the coring is done after the luminance channel has been time shifted to provide scrambling. Also the coring is done by the inverted summing (subtraction) of a portion of the output signal of an amplifier that limits or clips an input signal. Thus, in accordance with the invention, at low input signal levels, such as, for example, +0.1 to −0.1 volt signals (or smaller), the subtraction is complete because the amplifier is operating in its linear range. However, at selected higher signal levels over the 0.1 volt absolute, (or smaller than 0.1 volt), subtraction is limited and accordingly most of the higher input signals are allowed passage. FIG. 1C depicts a typical coring circuit as discussed above. FIG. 1D depicts generally the transfer characteristic of a coring circuit. For a circuit such as illustrated in FIG. 1C, the deadband voltage, V, is about 0.7 volt. In a coring circuit using a transistor differential pair, the deadband voltage, V, is 0.1 volt or less.

Figure 1A:
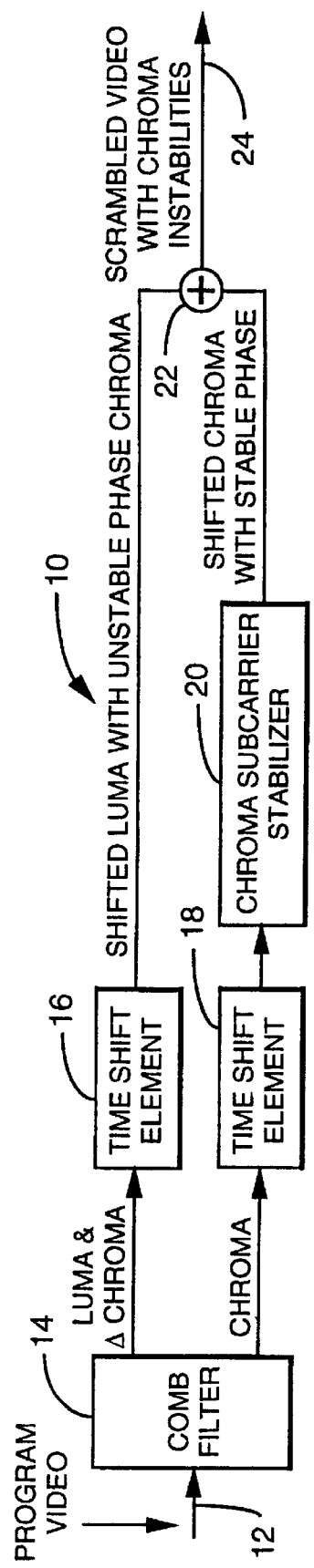
FIG. 1A is a block diagram of a prior art positionally shifted video scrambler using luminance/chrominance comb filtering.

More particularly, FIG. 2A depicts a system level block diagram of how an embodiment of the present invention is implemented into a scrambling system 50 such as that described in FIG. 1A. The composite program video signal on an input lead 52 is supplied to a comb filter 54 similar to comb filter 14 in FIG. 1A. As in FIG. 1A, the comb filter 54 supplies outputs comprising a luma signal on a lead 57 that contains residual chroma, and a chroma signal on a lead 55. These two signals are supplied to a time shift element 58 and a time shift element 60, respectively. In accordance with the invention, a chroma coring circuit 62 preferably is inserted after the element 58 and thus between points A and B in the luma channel of FIG. 2A. The placement of the chroma coring circuit at this location in the scrambling system, provides a time shifted luma signal with zero, or a much reduced, time shifted unstable residual chroma. However, as an alternative, the chroma coring circuit 62 may be inserted prior to the element 58 at a location 56 between the comb filter 54 and the time shift element 58, as depicted in dashed lines. The chroma channel contains a time shift element 60 and a color subcarrier stabilizer 64 which perform respective functions of the time shift element 18 and the color subcarrier stabilizer 20 in FIG. 1A. The stabilized time shifted chroma and the time shifted luma with minimized time shifted residual chroma, are combined in an adder 66 to produce a scrambled video signal having a stable noise free chroma component on an output lead 68.

Figure 1B:
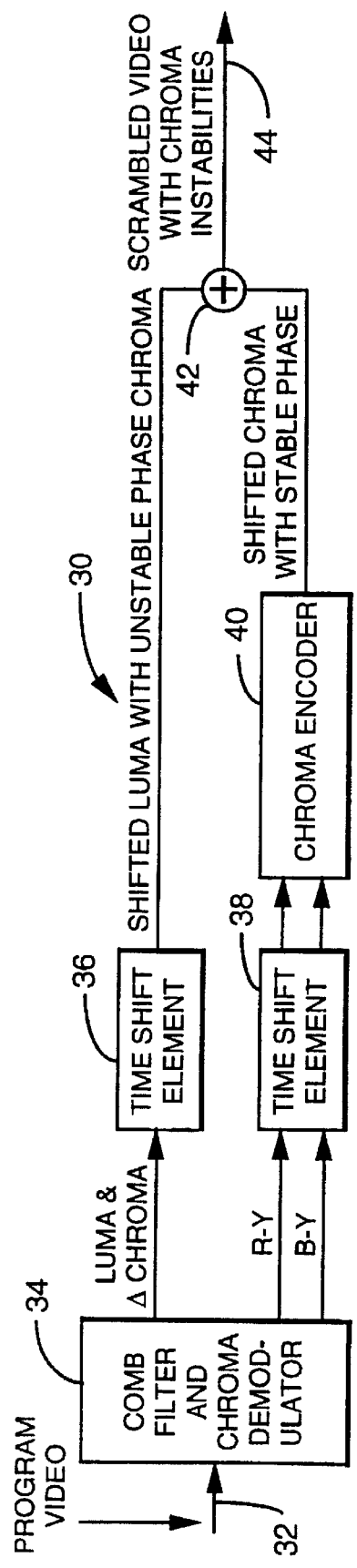
FIG. 1B is a block diagram of a prior art positionally shifted video scrambler using comb filtering with luminance and demodulated chroma, R-Y and B-Y components.
Figure 1C:
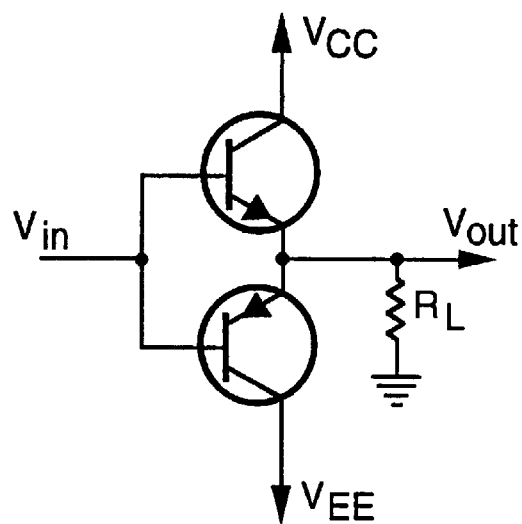
FIG. 1C is a schematic diagram depicting a basic typical coring circuit.
Figure 1D:
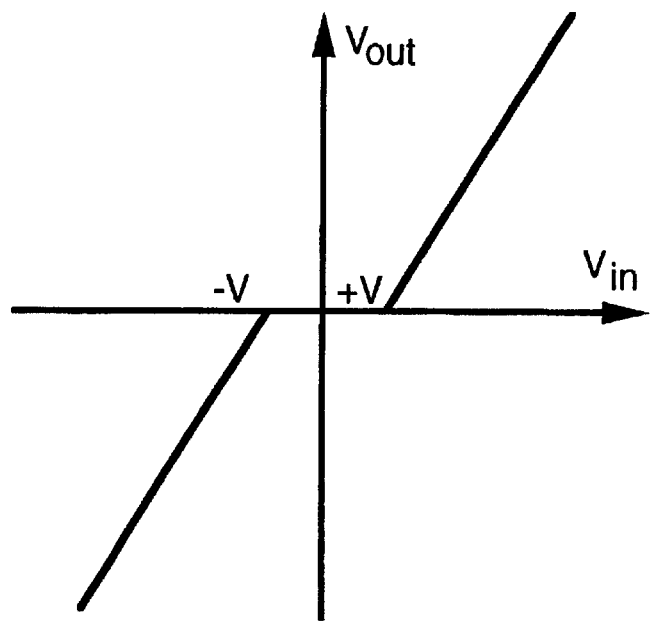
FIG. 1D is a graph illustrating a transfer function of the coring circuit of, for example, FIG. 1C.

FIG. 2B depicts a system level block diagram of how an embodiment of the present invention is implemented into a scrambling system 70 such as that of FIG. 1B. A coring circuit 84 is depicted inserted after a time shift element 80 and thus between points A and B in the luma channel. As in FIG. 2A, however, the coring circuit may be inserted prior to the element 80 as depicted in dashed lines at 76. As previously described, small amounts of unstable chroma component due to the imperfect comb filter are removed by the chroma coring circuit 84.

Figure 2C:
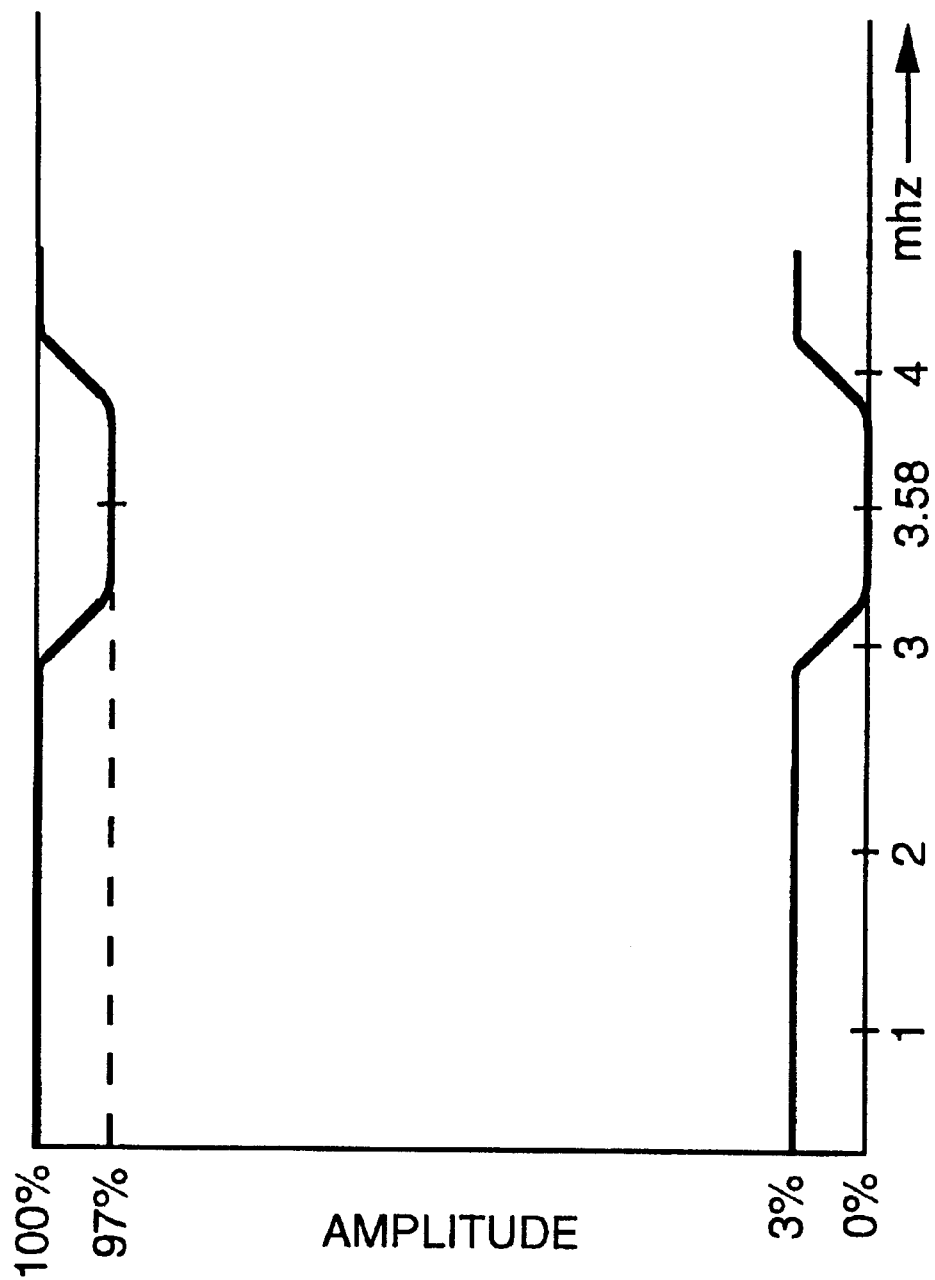
FIG. 2C is a graph illustrating the chroma coring effect on the luma channel signal as a function of input signal level.

Thus, the chroma coring circuit of FIGS. 2A and 2B remove from the luma signal, low level signals whose frequencies are in the region of the color subcarrier frequency. These low level signals constitute the chroma which is not removed from the luma signal by the comb filters 54 and 74, or an equivalent circuit. Larger level signals pass through the chroma coring circuit. For example, the chroma coring circuit of FIGS. 2A, 2B is set to remove no more than 3% of the nominal signal level around 3.58 MHz. This means if the scrambled luma channel has a residual chroma component of 3% or less, the chroma coring; circuit will completely or substantially remove the unstable chroma component. FIG. 2C depicts the chroma coring effect on the luma channel as a function of input level. In practice, depending on cost, comb filters in general produce a residual chroma component in the luma channel from about 3% to about 0.3%.

It should be noted that the chroma coring system also reduces random noise in the luminance channel caused by quantizing noise or noise in the video frequency band. In general, the chroma coring can be more generic. By coring small signals above 500 kHz, the circuit not only eliminates residual (unstable) chroma from the scrambled luminance channel, but also reduces video noise present in the luminance channel.

FIG. 3 illustrates an embodiment 100 of a chroma coring circuit of the invention, such as circuits 62, 84 of FIGS. 2A, 2B. The signal at point A is the time shifted luminance signal with an unstable residual chroma component, supplied via a lead 102 to an amplifier 104, which has for example a gain of two. The output of the amplifier 104 is supplied to a bandpass filter 106. The filter 106 can be a low Q bandpass filter set at the color subcarrier frequency of 3.58, for example, or some other filter like a high pass filter set at about 500 kHz, wherein the bandpass filter cores the unstable residual chroma while the high pass filter removes other video noise. The output of the filter 106 is amplified by an amplifier 108 with for example a gain of five, and then is supplied to an amplifier with limited headroom (or positive and negative clippers) such as a limiting amplifier 110. This limiting amplifier can be a transistor differential pair amplifier with maximum input of about +/−100 millivolts, as further described below. The differential pair amplifier 110 may have a gain of minus unity for inputs less than +/−100 millivolts and thus limits or clips signals having greater input levels. The output of the differential pair amplifier 110 is attenuated in this example by ⅕ in an attenuator 111, and is supplied to a first input of a summing amplifier 112. The output of the amplifier 104 also drives a delay line 113 (or low pass filter) to match the delay caused by the filter 106, amplifier 108, limiting amplifier 110 and the ⅕ attenuator 111. The output of the delay line 113 is supplied to a second input of the summing amplifier 112. Typically the luminance level at A is 700 millivolts. The output of the delay line 113 thus is 1400 millivolts and the output of the 115 attenuator 111 is 40 millivolts. The output of the summing amplifier 112 then will subtract up to 40 millivolts (about 3% or 40⁄1400) of residual chroma from the luma channel signal provided on output lead 114 corresponding to point B of FIGS. 2A, 2B.

FIG. 4 illustrates an embodiment 120 of an adaptive coring circuit of the invention which uses the chroma signal amplitude in the chroma channel, that has been time or position shifted, to modulate the amount of coring applied to the luma channel. In FIG. 4, the components in the figure are similar to the respective components in FIG. 3, although numbered differently. Coring depth is controlled by varying the maximum output level of a limiting amplifier 140 (which is similar to the limiting amplifier 110 of FIG. 3), while keeping its small signal gain constant. To this end, the chroma channel signal from, for example, the color subcarrier stabilizer 64 or chroma encoder 86 of FIGS. 2A, 2B, respectively, is supplied via a lead 142 to an amplifier 144 of an adaptive coring control circuit 145. The amplified signal is supplied to a full wave rectifier (or envelope detector) 146, and the resulting signal is smoothed via a capacitor 148/resistor 151 network. An amplifier 152 supplies a voltage from the control circuit 145 which is proportional to the chroma signal amplitude, to control the output level of the limiting amplifier 140. Thus, the higher the color saturation, the higher the clipping level of the limiting amplifier 140 is raised. This raises the amount of chroma frequency coring. Conversely, if there is a lack of color in the program video, the clipping level is reduced which provides very little, or zero, coring of the signal in the luminance channel. The resulting adaptively cored signal is supplied on an output lead 160 corresponding to the point B.

FIG. 4 illustrates one of various ways of providing adaptive coring using an adaptive coring control circuit. Alternatively, for example, it is possible to supply the output of the amplifier 152 to control the circuits 130 and 156 instead, such that a value K2 of circuit 130 varies inversely with the chroma amplitude in the time shifted chroma channel to keep the limiting amplifier 140 at a corresponding fixed clipping level. For instance, if the chroma level is low, the value K2 should be large, for example, K2≈10, for about 1.5% of coring. If the chroma level is higher, K2 should be lower, for example, about 5 for about 3% of coring.

Figure 5:
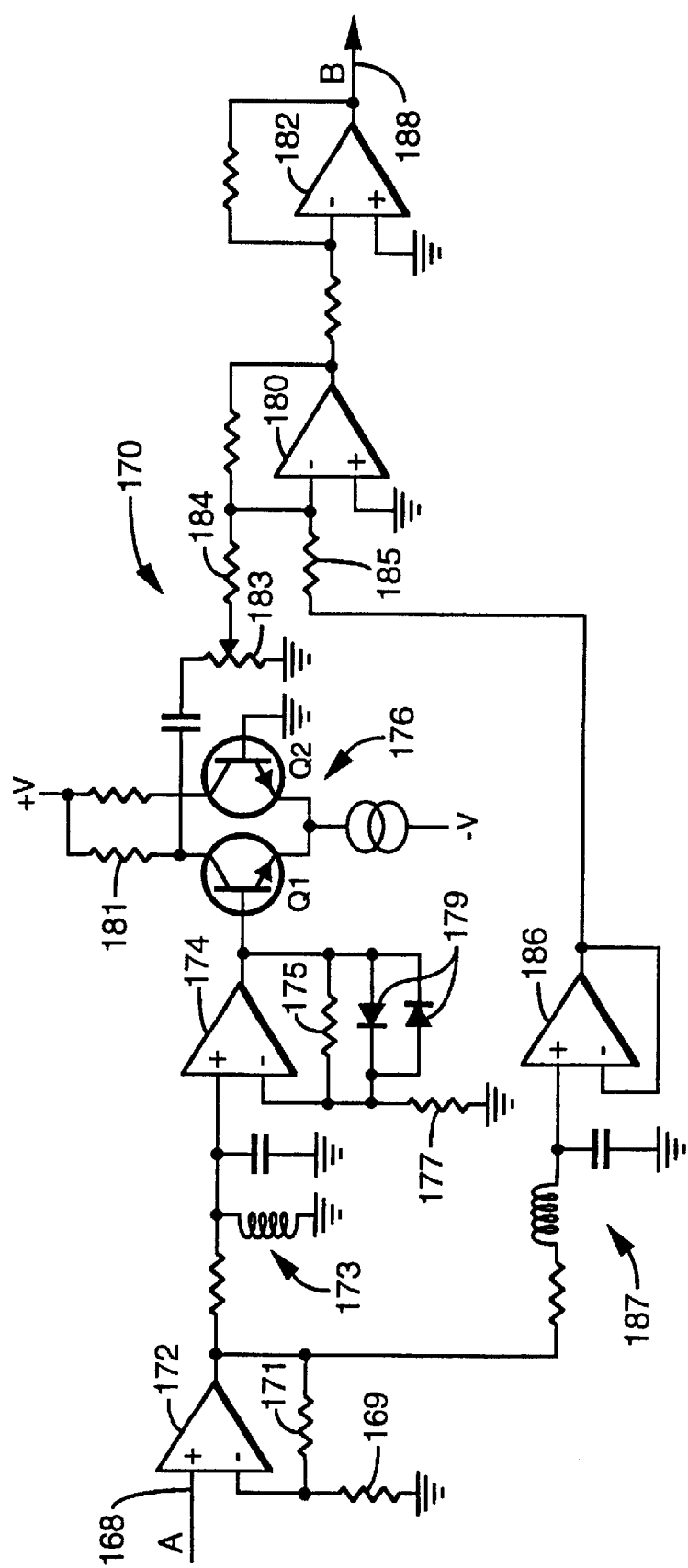
FIG. 5 is a schematic diagram illustrating further details of the invention of FIGS. 3, 4.

FIG. 5 illustrates a modified embodiment 170 of a coring circuit with fixed level of coring. The components illustrated in FIG. 5 correspond to those of the previous figures, though shown in more detail. As previously discussed, the coring circuit of FIG. 5 or its equivalent also can be inserted either prior to or after the time shift element of, for example, FIGS. 2A and 2B, to achieve the goal of removing chroma instabilities in the scrambled composite video signal.

To this end, the time shifted luma with unstable residual chroma is supplied via a lead 168 and is amplified by a feed back amplifier 172, with a gain of two set via resistors 169, 171. The output of the amplifier 172 is supplied to a chroma bandpass filter of Q less than two, formed of a resistor/inductor/capacitor network 173. The output of chroma bandpass filter 173 is supplied to a non-inverting input of an amplifier 174. Amplifier 174 is set at a gain which determines the coring depth. For instance if amplifier 174 is set for a gain of five via resistors 175, 177 coupled to its inverting input, the coring depth is about 3% to 3.5%. If the amplifier 174 is set for a gain of seven, the coring depth is about 2% to 2.5%. Diodes 179 limit the amplifier 174 output to about 1.4 volts peak-to-peak, to insure that the output of amplifier 174 does not reverse breakdown Q1 and Q2 base emitter junctions of a limiting amplifier 176. The differential amplifier circuit of Q1 and Q2 is used specifically herein as the limiting amplifier 176, with limiting occurring when the voltage at the base of Q1 exceeds about 100 millivolts positive or negative. The inverting output of the amplifier 176 is provided at a collector of Q1 via a resistor 181 and an adjustable resistor 183. A gain of minus 1 is derived via the base of Q1 to the slider of resistor 183 at signals less than 100 millivolts peak into the base of Q1. Amplifier 180 and amplifier 182 form a summing amplifier, with a resistor 185 coupled to the inverting input of amplifier 180 receiving about 1.4 volts of video signal (not including the sync signals) via a delay line formed of a resistor/inductor/capacitor network 187 and a buffer amplifier 186. The delay line is necessary to match the delay in the chroma bandpass filter 173 and the limiting amplifier 176, so that maximum nulling or coring can occur at about the chroma frequency. Because the limiting amplifier 176 outputs ⅕ or 1/7 of a maximum of plus/minus 100 millivolts (200 millivolts peak-to-peak), the maximum subtraction of signals around the chroma frequency via the resistor 185 and a resistor 184 is 200 millivolts/5=40 millivolts (or 200 millivolts/7=28.5 millivolts). Thus the coring depth referenced to the video signal of 1400 millivolts is then $40/1400$ or approximately 3%, or $28.5/1400$ or approximately 2%.

It should be noted that any coring depth can be achieved by setting the gain of the amplifier 174. Usually it is preferable to use the minimum coring depth needed for an acceptable stable chroma output, because excessive coring will cause an undesirable decrease of luminance detail along with a desirable reduction in luminance noise. If the Q of the chroma bandpass filter 173 is raised to greater than 2, the coring depth can be increased without losing much, or as much, luminance detail, since coring in this case will be around a narrower band in the region of the chroma frequency. However, care must be taken to insure that the cored signal on an output lead 188, and thus the output of the scrambler system, still is acceptably free of residual chroma instabilities.

Figure 6:
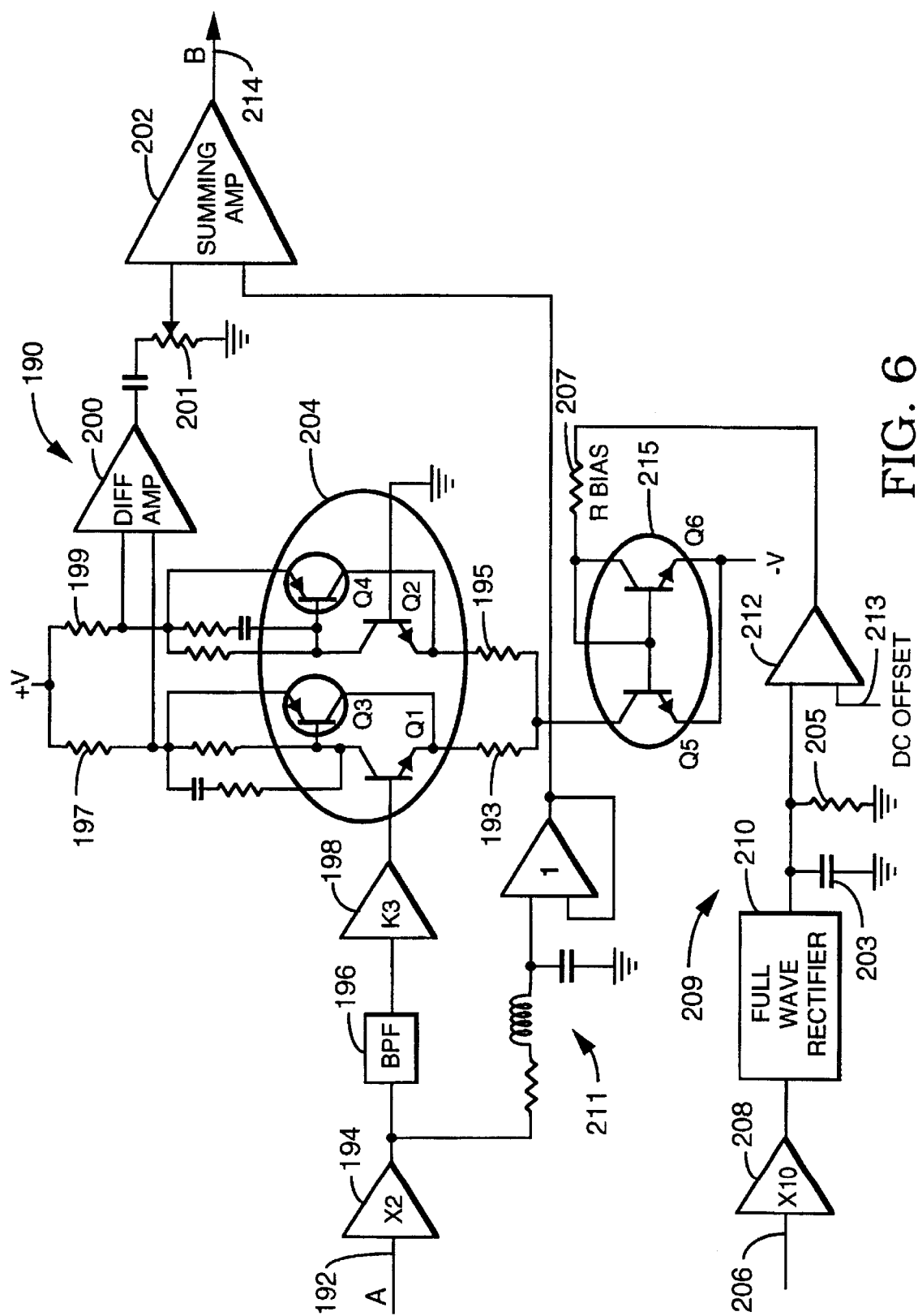
FIG. 6 is a schematic diagram illustrating another embodiment of an adaptive chroma coring circuit of the invention.

FIG. 6 illustrates a further embodiment 190 of an adaptive chroma coring circuit employing an adaptive coring control circuit 209. In this embodiment, the coring depth again is adjusted, as in FIG. 4, by sensing the chroma chanel's signal amplitude. As previously mentioned, the coring circuit of FIG. 6, whether adaptive or fixed, may be inserted after the comb filter and prior to a respective time shift element. The FIG. 6 embodiment further is applicable when the invention is used to increase luminance-chrominance separation for comb filters used in television sets, video recorders, etc.

FIG. 6 includes components similar to those of FIG. 5 except that a limiting amplifier 204 in FIG. 6, employs transistors Q1, Q2, Q3 and Q4 to form a compound feedback differential amplifier. The gain in limiting amplifier 204 is substantially independent of emitter tail current via the collector current of a transistor Q5 of transistor pair Q5, Q6, but the output clipping level is proportional to the emitter tail current via the Q5 collector current. The forming of a very high transconductance amplifier via Q1, Q2, Q3, Q4 and resistors 197, 199, and local feedback resistors 193, 195, provides an overall transconductance for the amplifier of about 1/resistor 193. Note that resistors 193, 195 preferably are of equal resistance. The peak clipping output level at resistor 197 and/or resistor 199 is proportional to the emitter tail current (Q5 collector current) multiplied by the resistance of resistor 197. Resistors 197, 199 are output load resistors for the amplifier 204, whose outputs herein are fed to (an optional) differential amplifier 200, which rejects the chroma channel's envelope signal supplied via the output of an amplifier 212 in the adaptive coring control circuit 209. An adjustable resistor 201 is adjusted for the maximum of coring (subtraction) with the output of the limiting amplifier 204. A summing amplifier 202 is coupled to the adjustable resistor 201 and to a delay line 211 similar to the delay lines of FIGS. 3–5. The output of the amplifier 202 on an output lead 214 then is the luminance signal with minimized unstable chroma.

As in FIG. 4, the adaptive coring control circuit 209 of FIG. 6 includes an amplifier 208 which amplifies the chroma channel signal on a lead 206 and then supplies the signal to a full wave rectifier 210 (or an envelope detector). The output of the full wave rectifier or envelope detector is smoothed via a charge capacitor 203, which is discharged via a resistor 205. An amplifier 212 outputs a voltage proportional to the chroma signal amplitude. Additionally, a DC offset is supplied at 213 to amplifier 212 to bias a voltage to current convertor circuit 215 formed of a bias resistor 207 and the transistors Q3 and Q4. The Q3 collector current then is proportional to the chroma signal amplitude. The higher the color saturation, the higher the Q3 collector current. In turn, a higher clipping level is supplied by the limiting amplifier 204, which raises the amount of chroma frequency coring. If there is no color in the program video signal, then the Q3 collector current approaches zero and the clipping level at resistor 197 or 199 is near zero (for near zero output) and thus there is zero, or very little, coring performed on the luminance channel signal.

Figure 7:
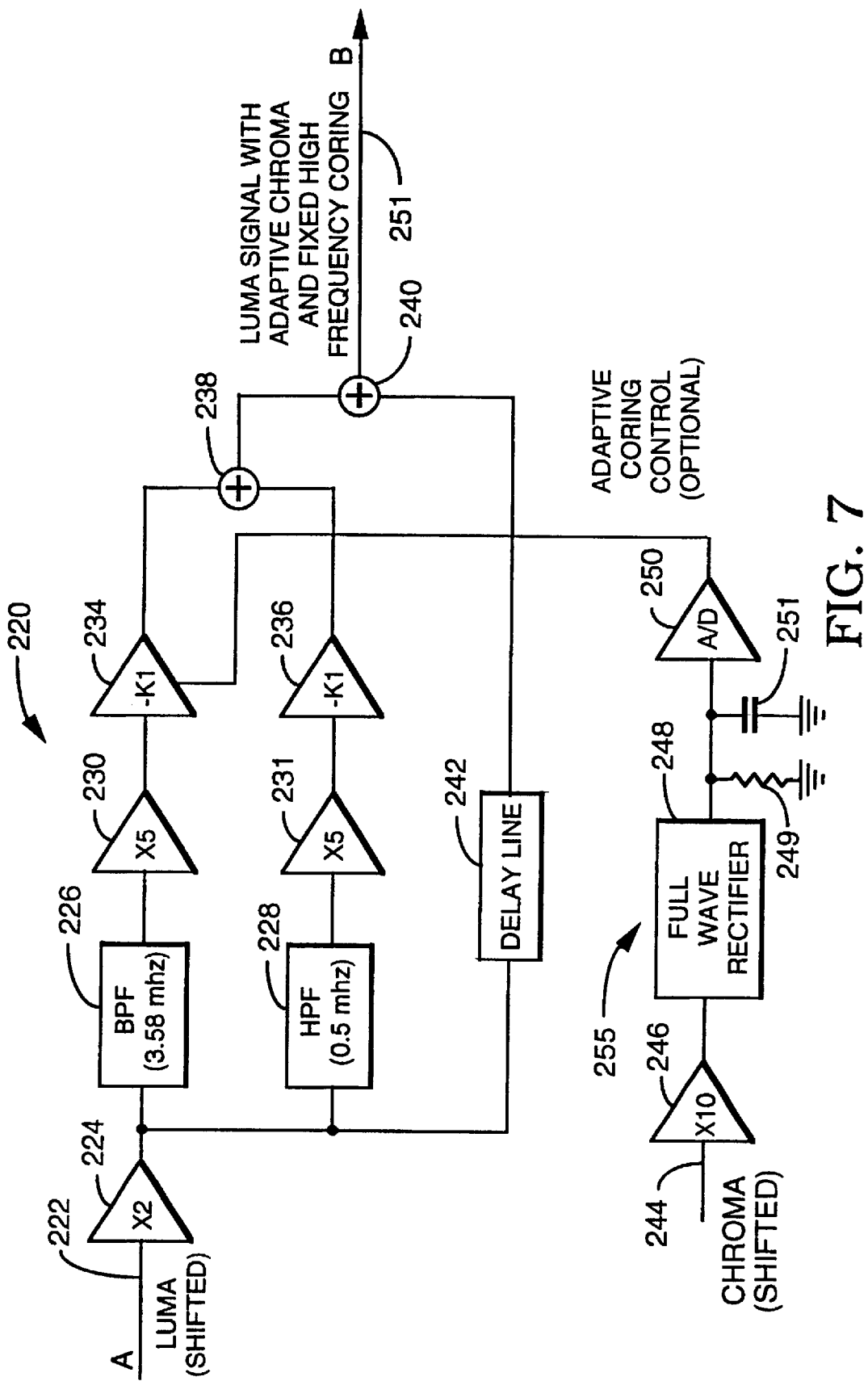
FIG. 7 is a block diagram illustrating a further embodiment comprising a multiband coring circuit configured to include adaptive and/or fixed coring around the chroma frequencies.

FIG. 7 illustrates an embodiment 220 of a multiple band frequency coring system, where coring is done at the chroma frequency via a bandpass filter 226 in a first coring path, and at other frequencies for further noise reduction of the luminance channel signal via a high pass filter 228 in a second parallel coring path. FIG. 7 also illustrates the alternative of adaptive coring on the residual chroma frequencies in the first coring path by means of an adaptive coring control circuit 255, while providing fixed coring at other frequencies by utilizing the high pass filter 228 in the second parallel coring path. It should be noted that the high pass filter 228 may include a notch filter set at the frequency of the bandpass filter 226 so there is no phase interaction at summing circuits 238 and/or 240.

The additional components 224, 230, 234 are similar to respective components of the previous FIGS. 3–6, and the components 231, 236 in the second parallel coring path of the high pass filter 228 are similar to the respective components in the first coring path of the bandpass filter 226. Likewise, a delay line 242 is similar to the delay lines 113, 128, 187–186, 191–204, respectively, of FIGS. 3–6. In similar fashion, the adaptive coring control circuit formed of the components 246, 248, 250 and 249–251 also are similar to respective components of the adaptive coring circuits of FIGS. 4 and 6.

It should be reiterated that this invention can be used to enhance video comb filter performance in television sets.

Video tape recorders can utilize the concepts to improve their performance via noise reduction and increased luma-chroma separation.

Although the invention has been described herein relative to specific embodiments, various additional features and advantages will be apparent from the description and drawings, and thus the scope of the invention is defined by the following claims and their equivalents.

What is claimed is:

1. A method of minimizing chroma subcarrier instability in a line scrambled video signal, wherein the chrominance signal is imperfectly separated from the luminance signal to produce a scrambled chrominance signal having stable chroma and a luminance signal containing stable residual chroma before the scrambling process but unstable residual chroma after the scrambling process, characterized by the steps of:

coring the luminance signal before or after scrambling at a selected level to limit passage of the unstable residual chroma in the luminance signal when the level of the unstable residual chroma is less than the selected level while allowing passage of signals of levels greater than the selected level, to provide a scrambled luminance signal with minimized unstable residual chroma; and summing the scrambled chrominance signal having stable chroma with the scrambled luminance signal with minimized unstable residual chroma to provide the line scrambled video signal with minimized chroma subcarrier instability.

2. The method of claim 1 wherein the step of coring includes:

providing a crossover distortion threshold commensurate with a selected voltage level of the unstable residual chroma to be limited from passage; and coring the stable residual chroma or unstable residual chroma from the luminance signal below said threshold to substantially remove it from the scrambled luminance signal.

3. The method of claim 2 including the step of:

detecting the amplitude of the scrambled chrominance signal; and varying the crossover distortion threshold level in response to the detected amplitude of the scrambled chrominance signal to correspondingly vary the amount of coring of the unstable residual chroma in the luminance signal.

4. The method of claim 3 including the step of:

generating a variable current signal indicative of the scrambled chrominance signal amplitude in response to the step of detecting; and varying the threshold level in response to the variable current signal while maintaining the gain of the luminance signal constant.

5. The method of claim 3 wherein the threshold level is set to core from 0% to about 3.5% of the input video signal level around the chroma subcarrier frequency.

6. A method of minimizing chroma subcarrier instability in a video signal scrambled via a line scrambling process, wherein imperfect separation of the chrominance and luminance signals during the scrambling process provides a luminance signal with residual chroma, and the scrambling process generates a scrambled chrominance signal and an unstable residual chroma signal in the scrambled luminance signal, comprising the acts of:

providing a crossover distortion threshold determinative of low level chroma components which are to be denied passage;

coring the luminance signal with residual chroma, or the luminance signal with unstable residual chroma, at said threshold to allow passage of signal levels greater than the threshold while substantially denying passage of the residual or unstable residual chroma signal levels less than the threshold; and combining the cored scrambled luminance signal with the scrambled chrominance signal to produce the line scrambled video signal with minimized chroma subcarrier instability.

7. The method of claim 6 wherein the act of coring occurs prior to the line scrambling process and removes the residual chroma.

8. The method of claim 6 wherein the act of coring occurs after the line scrambling process and removes the unstable residual chroma.

9. The method of claim 6 including the acts of:

detecting the amplitude of the chrominance signal before or after the scrambling process; and varying the cross over distortion threshold to correspondingly vary the depth of coring of the luminance signal in proportion to the detected chrominance signal amplitude.

10. Apparatus for minimizing chroma subcarrier instability in a video signal scrambled via a line scrambling system, wherein imperfect separation of the chrominance and luminance signals in respective chrominance and luminance chanels integral with the line scrambling system causes a scrambled chrominance signal having stable chroma, and a scrambled luminance signal having unstable residual chroma signals and/or other noise after the scrambling process in the line scrambling system, the apparatus comprising:

a time or position shifting circuit for providing a scrambled chrominance signal having stable chroma signals;

a chroma coring circuit receiving the luminance signal containing residual chroma signals, for denying passage of the residual chroma signals and/or other noise and allowing passage of signals of levels greater than the residual chroma signals;

a time or position shifting circuit responsive to the chroma coring circuit for scrambling the luminance signal received from the chroma coring circuit to provide a scrambled luminance signal with minimized unstable residual chroma signals and/or other noise;

summing means for combining the scrambled chrominance signal having stable chroma signals with the scrambled luminance signal with minimized unstable residual chroma signals and/or other noise to provide the line scrambled video signal with minimized chroma subcarrier instability;

wherein the chroma coring circuit includes;

a filter circuit for removing the unstable residual chroma signals and/or other noise from the luminance signal; and a limiting circuit responsive to the filter circuit and to a preselected threshold for selectively coring the signal supplied by the filter circuit.

11. The apparatus of claim 10 including:

an amplifier of selected gain coupled between the filter circuit and the limiting circuit;

an attenuator, having an attenuation commensurate with the selected gain of the amplifier, coupled to the limiting circuit;

a summing amplifier coupled to the attenuator; and a delay circuit for supplying the scrambled luminance signal with unstable residual chroma signals to the summing amplifier;

wherein the summing amplifier subtracts a selected percentage of residual chroma signals from the luminance signal.

12. Apparatus for minimizing chroma subcarrier instability in a video signal scrambled via a line scrambling system, wherein imperfect separation of the chrominance and luminance signals in respective chrominance and luminance channels generates a scrambled chrominance signal after the scrambling process, and a scrambled luminance signal having residual chroma before the scrambling process but having unstable residual chroma after the scrambling process, the apparatus comprising:

coring means including a crossover distortion threshold and disposed in the luminance channel, for denying passage of residual chroma signals while allowing passage of signals greater than the residual chroma signals in response to the threshold, to provide a luminance signal having substantially stable residual chroma signals; and summing means for combining said luminance signal having substantially stable residual chroma signals with the scrambled chrominance signal, to provide the scrambled video signal with minimized chroma subcarrier instability.

13. The apparatus of claim 12 wherein said coring means is disposed in the luminance channel prior to the line scrambling system and removes the residual chroma signals.

14. The apparatus of claim 12 wherein said coring means is disposed in the luminance channel after the line scrambling system and removes the unstable residual chroma signals.

15. The apparatus of claim 12 wherein the coring means includes:

means for generating the crossover distortion threshold of such a level that the residual chroma signals are below the threshold and generally are denied passage while signals greater than the residual chroma signals are above the threshold and are allowed passage.

16. The apparatus of claim 15 wherein the coring means includes:

limiting amplifier means with a selected maximum input and a gain of minus unity, said limiting amplifier means thereby limiting signals of greater than the selected maximum input.

17. The apparatus of claim 15 wherein the coring means includes:

filter means for receiving the luminance signal and for supplying a signal at the chroma subcarrier frequency;

limiting amplifier means responsive to the filter means for clipping the chroma subcarrier frequency signal at said threshold; and a summing amplifier responsive to the clipped signal for supplying a luminance signal with generally stable residual chroma to said summing means for combining with the scrambled chrominance signal.

18. The apparatus of claim 15 wherein the generating means includes:

means for setting the threshold level to core from 0% to about 3.5% of the video signal level around the chroma subcarrier frequency.

19. The apparatus of claim 15 including:

coring control means for varying the crossover distortion threshold in response to the amplitude of the chrominance signal.

20. The apparatus of claim 19 wherein the coring control means includes:

means for detecting the amplitude of the chrominance signal;

means, including rectifying means, for providing a variable current control signal in response to the detected chrominance signal amplitude.

21. The apparatus of claim 20 wherein the coring means further includes:

a limiting amplifier circuit responsive to the variable current control signal for clipping the luminance signal at the varying crossover distortion threshold to substantially remove the residual chroma signals.

22. The apparatus of claim 15 wherein the coring means further includes:

a filter circuit for receiving the luminance signal and for supplying a signal at the chroma subcarrier frequency;

an amplifier of preselected gain coupled to the filter circuit;

limiting amplifier means coupled to the amplifier of preselected gain for limiting the signal therefrom at the crossover distortion threshold; and attenuating means coupled to the limiting amplifier means for attenuating the signal by the inverse value of the preselected gain of the amplifier.

23. The apparatus of claim 22 including:

means for detecting the amplitude of the chrominance signal; and wherein the preselected gain of the amplifier and the inverse value of the preselected gain are varied in response to the detected amplitude of the chrominance signal to vary accordingly the threshold.

* * * * *